United States Patent [19]

Tsuzuku et al.

[11] 4,426,341
[45] Jan. 17, 1984

[54] TRANSFER MOLDING METHOD AND TRANSFER MOLDING MACHINE

[75] Inventors: Susumu Tsuzuku, Tokyo; Aizo Kaneda; Junichi Saeki, both of Yokohama; Masayoshi Aoki, Kamakura, all of Japan

[73] Assignee: Hitachi, Ltd., Tokyo, Japan

[21] Appl. No.: 411,759

[22] Filed: Aug. 26, 1982

Related U.S. Application Data

[63] Continuation of Ser. No. 191,299, Sep. 26, 1980, abandoned.

[30] Foreign Application Priority Data

Sep. 28, 1979 [JP] Japan ................................ 54-124033

[51] Int. Cl.$^3$ ............................................... B29G 3/00
[52] U.S. Cl. .............................. 264/40.1; 264/328.4; 264/328.13; 425/136; 425/149; 425/170
[58] Field of Search ........................ 425/136, 149, 170; 264/328.4, 328.5, 328.13, 40.1

[56] References Cited

U.S. PATENT DOCUMENTS

| | | | |
|---|---|---|---|
| 2,786,234 | 3/1957 | Beyer | 264/328.13 |
| 3,137,038 | 6/1964 | Maynard | 264/328.5 X |
| 3,243,752 | 3/1966 | Lawrence | 264/328.4 X |
| 3,628,901 | 12/1971 | Paulson | 425/149 |
| 4,060,362 | 11/1977 | Wilson | 425/145 |
| 4,366,110 | 12/1982 | Morito | 264/328.13 |

FOREIGN PATENT DOCUMENTS 52-38568  3/1977  Japan ............................ 264/328.13

Primary Examiner—Thomas P. Pavelko
Attorney, Agent, or Firm—Antonelli, Terry & Wands

[57] ABSTRACT

A transfer molding machine for filling at least one cavity of a mold with a resin by means of a plunger including a resin pressure sensor for sensing the resin pressure in the mold, and a control device for controlling the pressure applied to the plunger to drive same in such a manner that an arbitrarily selected primary pressure higher than a holding pressure is applied to the plunger to drive same until the pressure of the resin charged into the mold which pressure is detected by the resin pressure sensor in the mold reaches a predetermined pressure level and a secondary pressure corresponding to the holding pressure is applied to the plunger to drive same after the predetermined pressure level has been exceeded by the pressure of the resin being charged into the mold sensed by the resin pressure sensor in the mold, and a warning device that issues a warning when the pressure applied to the plunger to drive has exceeded a predetermined pressure.

6 Claims, 5 Drawing Figures

TRANSFER MOLDING METHOD AND TRANSFER MOLDING MACHINE

This is a continuation of application Ser. No. 191,299, filed Sept. 26, 1980 now abandoned.

BACKGROUND OF THE INVENTION

This invention relates to transfer molding machines suitable for use in firmly encapsulating semiconductor elements and other electronic parts within a resin, and more particularly it is concerned with a transfer molding machine of the type described capable of achieving an increase in the yield of the molded products.

A conventional transfer molding machine and a molding process of the prior art are shown in FIG. 1 wherein a plunger driving hydraulic circuit thereof is illustrated. In FIG. 1, a working fluid delivered by a pump 1 flows through a working fluid conduit 10 into a transfer cylinder 5, to move downwardly a plunger 6 mounted in the transfer cylinder 5, to force resin 9 to flow into a cavity 8 through a runner 7 in a mold 30. The resin 9 is set as it is heated in the mold 30, to enable a molded product of the desired shape to be obtained.

In the transfer molding described hereinabove, it is essential that the resin 9 be filled in the cavity 8 in a predetermined time. Unless this is accomplished, the resin 9 would set during the process of being charged, that is, often called 'the gates are sealed', and the products obtained would be defective and unacceptable due to the presence of voids or unmolded regions.

To fill the cavity 8 with the resin 9 in a predetermined time, the velocity at which the plunger 6 moves downwardly should not be below a predetermined level. A relief valve 2 and a flow rate regulating valve 3 are mounted in the plunger driving hydraulic circuit (hereinafter referred to as hydraulic circuit) to control the pressure in the hydraulic circuit and the velocity of downward movement of the plunger 6.

FIG. 2 is a diagram showing a displacement Z of the plunger 6 and a pressure indicated by an oil pressure gauge 4 of the hydraulic circuit (hereinafter referred to as transfer oil pressure $P_o$) in relation to a time t elapsed during the molding process, obtained when molding is carried out by a molding machine provided with the hydraulic circuit shown in FIG. 1.

It will be seen that as the plunger 6 moves downwardly, flow resistance offered to the resin 9, which is correspond to the pressure required to make the resin 9 flow at a unit rate, increases, causing a rise in a load applied to the plunger 6. This causes an increase in the transfer oil pressure $P_o$. As the transfer oil pressure $P_o$ approaches a pressure $\overline{P}_{OM}$ at which the relief valve 2 is set, an inclination of the displacement Z of the plunger 6 with respect to the axis of time becomes smaller. That is, the velocity of downward movement of the plunger 6 begins to decrease. This is caused by the properties of the flow rate regulating valve 3 which is constructed such that when a difference between a pressure on the upstream side of the valve 3 which corresponds to $\overline{P}_{OM}$ and a pressure on the downstream side thereof which corresponds to $P_o$ becomes generally less than about 10 kg/cm$^2$, the flow rate is reduced below a predetermined value regarding the relief valve 3 and the velocity of downward movement of the plunger 6 is reduced. In FIG. 2, the numeral 21 indicates the time at which filling of the cavity 8 with the resin 9 is apparently completed.

FIG. 3 shows another example of the hydraulic circuit of a transfer molding machine of the prior art. In this example, a relief valve 2 is disposed downstream of a flow rate regulating valve 3, as contrasted with the example shown in FIG. 2 in which the flow rate regulating valve 3 is disposed downstream of the relief valve 2. In this type of hydraulic circuit, the pressure upstream of the flow regulating valve 3 is near the pump pressure, and the pressure differential between the pressure upstream of the flow rate regulating valve 3 and the pressure downstream thereof becomes very great, so that the hydraulic fluid flows through the flow rate regulating valve 3 at such a flow rate as having previously been set. However, this hydraulic circuit is not without a disadvantage. When the transfer oil pressure $P_o$ approaches the oil pressure $\overline{P}_{OM}$ at which the relief valve 2 is set, oil leaks from the relief valve 2 begin to take place due to the cracking characteristic of the relief valve 2, so that the hydraulic fluid supplied during a unit time to the transfer cylinder 5 is reduced in amount. This gives rise to the same phenomenon of the downward movement of the plunger 6 being reduced in velocity as described by referring to FIG. 2. With this phenomenon, the resin 9 would set during the process of being charged, or the gates are sealed, and so, the molded products would be defective due to the presence of voids or unmolded regions.

From the foregoing, it will be understood that in a hydraulic circuit having one relief valve and one flow rate regulating valve the velocity of downward movement of the plunger is generally reduced as the transfer oil pressure $P_o$ becomes close to the oil pressure $\overline{P}_{OM}$ at which the relief valve 2 is set (which is the maximum oil pressure in the hydraulic circuit).

To avoid a reduction in the velocity of downward movement of the plunger 6 requires either an increase in the oil pressure $\overline{P}_{OM}$ at which the relief valve 2 is set or a reduction in the transfer oil pressure $P_o$. However, the pressure $\overline{P}_{OM}$ at which the relief valve 2 is set is proportional to the pressure ultimately applied to the resin 9 in the cavity 8. Thus an increase in the pressure $\overline{P}_{OM}$ would raise the problems of flashes being formed in the produced articles at the interface of the mold members and damage being caused to the electronic parts which are enclosed firmly within the resin, such as break-out or short-circuit of gold wires.

Meanwhile the transfer oil pressure $P_o$ corresponding to the flow resistance offered to the resin 9 is determined by the velocity v of the plunger, the viscosity $\eta$ of the resin, and the shape of the flow channel in the mold. That is, the transfer oil pressure $P_o$ can be reduced by reducing the velocity of the plunger 6 or reducing the viscosity of the resin or facilitating the flow of the resin in the cavity as by increasing the diameter of the runner. However, a reduction in the velocity of downward movement of the plunger would result in the production of defective products as aforesaid. The viscosity of the resin can be reduced by increasing the temperature at which the resin is preheated. However, an increase in the preheating temperature tends to cause an incorporation of air in the resin during its transfer, thereby causing the production of defective products having voids or other defects. Thus the present practice is to increase the diameter of the runner for the mold to reduce the transfer oil pressure $P_o$. However, a thermosetting resin cannot be reused once it is set, so that the runner is a deadwood which must be discarded after a molding operation is performed.

More specifically, a transfer molding machine of the prior art has suffered the disadvantages that material is wasted and production cost is increased, because the runner of the mold should have its diameter increased to avoid a reduction in the velocity of downward movement of the plunger which is a source of trouble of producing defective products and an increase in the diameter of the runner results in an increase in the amount of wasted material. Particularly when a large number of products of more than 40-50 pieces in number, that is, the mold has more than 40-50 cavities, as described in U.S. Pat. No. 4,126,292, for example, are transfer-molded in a single operation, the length of the runners become very large and the flow resistance offered to the resin is greatly increased. As a result, a load applied to the plunger would be very great and a reduction in the velocity of downward movement of the plunger would be markedly high. Under such condition, the molds might be sealed at the gates and the incidence of voids due to incomplete filling of resins within the cavities would rise. Conversely, an increase in the diameter of the runners for avoiding an increase in the flow resistance offered to the resin would cause an increase in the amount of wasted material. Thus, this would not only be against the policy of conservation of natural resources but also greatly increase production cost.

SUMMARY OF THE INVENTION

This invention has been developed for the purpose of obviating the aforesaid disadvantages of the prior art. Accordingly, the invention has as its object the provision of a transfer molding machine which enables the dimensions of the runner of the mold to be reduced to minimize the waste of resin in transfer-molding and which enables void formation due to incomplete filling of the resin in the cavity to be avoided.

The outstanding characteristic of the invention is that the pressure of the resin being charged into a mold is sensed within the mold by a sensor so as to control the pressure, at which the plunger is driven to transfer the resin into the mold cavity in accordance with the resin pressure in the mold sensed by the sensor.

According to the invention, a maximum hydraulic pressure is set to a relatively high value (a primary pressure level) to avoid a reduction in the velocity of downward movement of the plunger at initial stages of injection of the resin into the mold, and the maximum hydraulic pressure is reduced (to a secondary pressure level) immediately before completion of filling of resin in the mold to thereby avoid an increase in the pressure of the resin in the mold more than is necessary.

According to the invention, switching of the resin charging pressure between the two pressure levels, which is an important factor in the whole process of controlling transfer molding, is timed such that the pressure is switched from the primary pressure level to the secondary pressure level when the pressure of the resin in the mold as detected by the sensor reaches a predetermined level, so that control can be effected irrespective of the amount of the supplied resin or the conditions under which transfer molding is carried out. In the invention, the resin is charged into the mold not only by raising the hydraulic pressure in the hydraulic circuit but also by nicely timing the switching of the pressure between two levels. By this feature, occurrence of flashes that would otherwise be caused at the interface of the mold members can be avoided and damage to the electronic part in the cavity can be avoided which would otherwise cause defects, such as a breakout of gold wires of a semiconductor element and short, that are not detected from outside.

In the case of the present invention where the pressure for charging the resin is switched between the primary pressure level and the secondary pressure level, the charging of the resin in the mold becomes possible even if the resin has an extraordinary high viscosity due to an inordinate lowering in the resin preheating temperature or due to the abnormality of the resin material itself. If this charging operation is allowed to exist without being checked, the products would appear normal as viewed from outside but have internal defects. Thus a large number of defective products would continue to be produced while without noticing the extraordinary rise in resin viscosity. To avoid this problem, means is provided according to the present invention for issuing a warning when the hydraulic pressure in the hydraulic circuit exceeds a predetermined level in the event of a rise in the viscosity of the resin. The invention also enables any abnormality, such as scratching, occurring in the sliding portions of the plunger and metallic mold to be detected, to increase the reliability of the machine in performance.

DESCRIPTION OF THE PREFERRED EMBODIMENT

Figure 1:
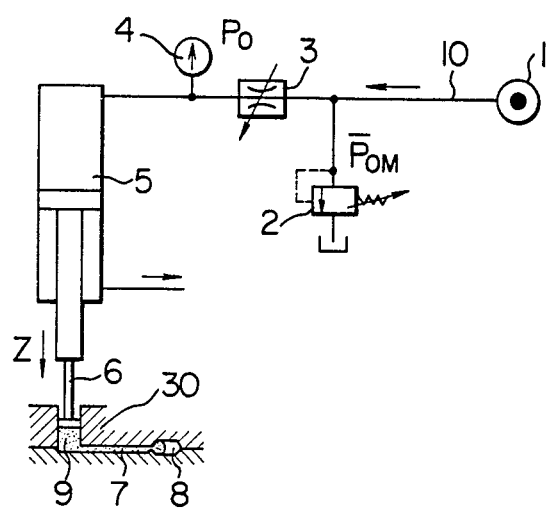
FIG. 1 is a diagram of a plunger driving hydraulic circuit in explanation of the plunger driving hydraulic circuit and a method of transfer-molding of the prior art.
Figure 2:
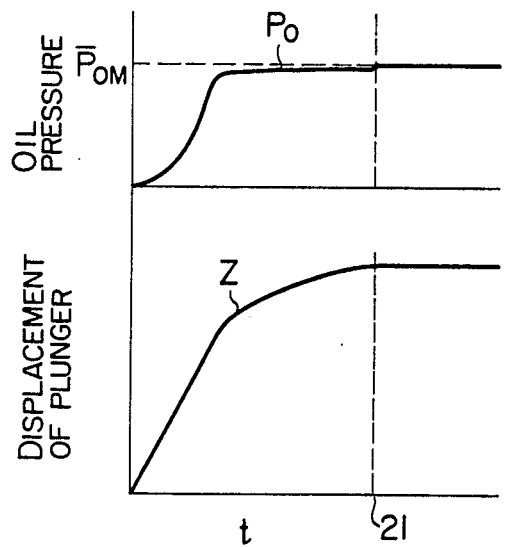
FIG. 2 is a diagram showing the transfer oil pressure and the plunger displacement in chronological sequence obtained in transfer-molding carried out by means of a transfer molding machine of the prior art.
Figure 3:
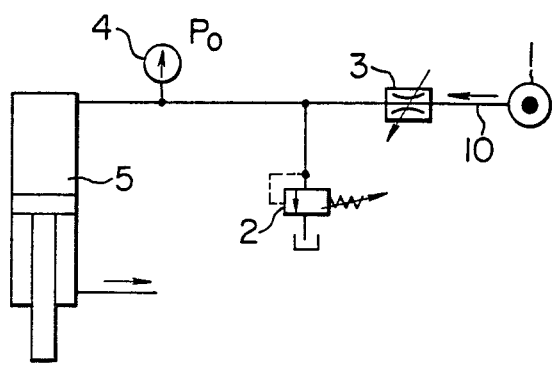
FIG. 3 is a diagram of a plunger driving hydraulic circuit showing another example of the plunger driving hydraulic circuit of the prior art.
Figure 4:
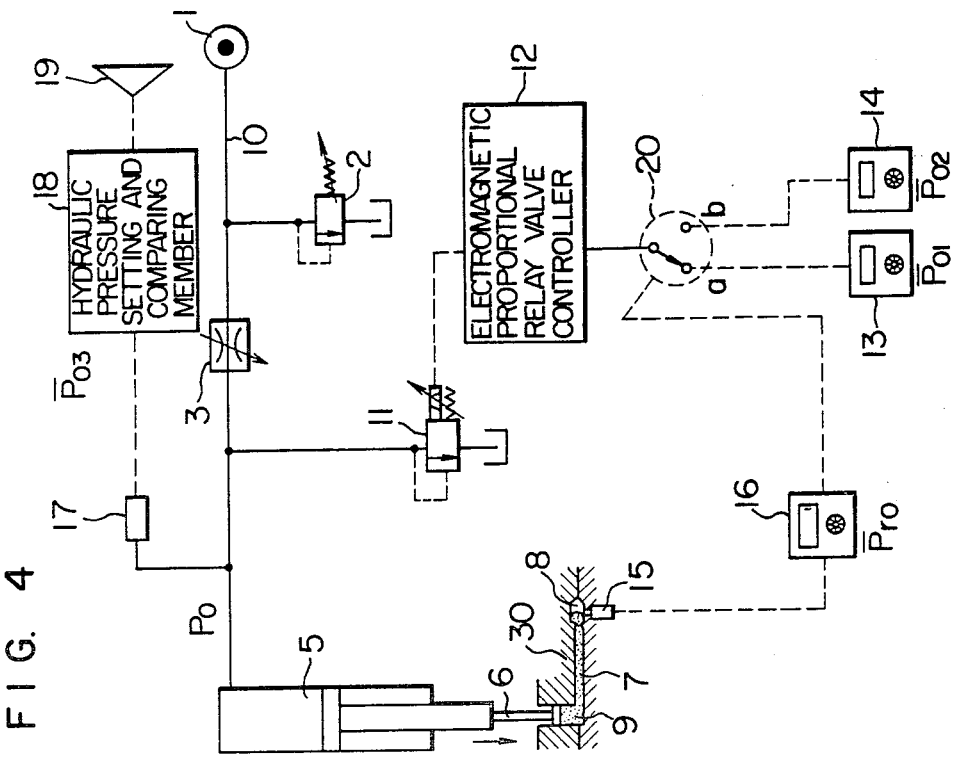
FIG. 4 is a diagram of a plunger driving hydraulic circuit, including control means shown in a block diagram, of the transfer molding machine comprising one embodiment of the present invention.

FIG. 4 is a diagram of a plunger driving hydraulic circuit, including control means shown in a block diagram, of the transfer molding machine comprising one embodiment of the invention. In FIG. 4, parts similar to those shown in FIG. 1 are designated by like reference characters.

In FIG. 4, a relief valve 2, a flow rate regulating valve 3 and an electromagnetic proportional relief valve 11 are mounted between a pump 1 and a transfer cylinder 5, to control the maximum hydraulic pressure and the flow rate of the fluid in the hydraulic circuit.

The electromagnetic proportional relief valve 11 has connected thereto an electromagnetic proportional relief valve controller 12, a set pressure change-over switch 20, a primary pressure setting member 13 and a secondary pressure setting member 14.

A cavity 8 has mounted therein a resin pressure sensor 15 for sensing the pressure of the resin in the cavity 8. The resin pressure sensor 15 has connected thereto a resin pressure setting and comparing member 16 which in turn is connected to the set pressure change-over switch 20. The resin pressure sensor 15 may be mounted at a terminal end of a runner instead of in the cavity.

A hydraulic pressure sensor 17 is connected to the transfer cylinder 5 and mounted in the hydraulic circuit. The sensor 17 has connected thereto a hydraulic pressure setting and comparing member 18 and an alarm buzzer 19.

The operation of the embodiment of the aforesaid construction will now be described. Prior to carrying out a transfer-molding operation, a predetermined pressure is set for each of the setting members 13 and 14, resin pressure setting and comparing member 16 and hydraulic pressure setting and comparing member 18. More specifically, a pressure corresponding to a pressure desired to be applied to the resin in the cavity or a hydraulic pressure $P_{o2}$ corresponding to an ordinary holding pressure is set for the secondary pressure setting member 14. A pressure $P_{o1}$ which is high enough not to cause damage to the plunger 6 and mold 30 even if a maximum hydraulic pressure that has been set is applied, is set for the primary pressure setting member 13. A pressure $P_{ro}$ lower than the holding pressure is set for the resin pressure setting and comparing member 16. The value of the pressure $P_{ro}$ which may vary depending on the position in which the resin pressure is measured and the velocity of downward movement of the plunger 6 may be suitably selected from the range between 10 and 60 kg/cm² when the holding pressure is 70 kg/cm², for example. A pressure $\overline{P}_{o3}$ set for the hydraulic pressure setting and comparing member 18 is to be subsequently described. The relief valve 2 is throttled so that a pressure higher than the pressure $\overline{P}_{o1}$ is set therefor.

After the aforementioned pressures are set for the setting members 13 and 14, resin pressure setting and comparing member 16 and hydraulic pressure setting and comparing member 18, the hydraulic pump 1 is actuated. The hydraulic fluid is discharged from the pump 1 into the hydraulic fluid conduit 10 from which it is passed on to the transfer cylinder 5 to move the plunger 6 downwardly, to force the resin 9 into the cavity 8.

A resin pressure Pr sensed by the resin pressure sensor 15 does not reach the pressure $\overline{P}_{ro}$ for which the resin pressure setting and comparing member 16 is set until complete filling of the resin 9 within the cavity 8 is obtained. Thus the resin pressure setting and comparing member 16 keeps the set pressure change-over switch 20 in engagement with a contact a so that the electromagnetic proportional relief valve 12 is connected to the primary pressure setting member 13. As a result, the electromagnetic proportional relief valve 11 is throttled, and the maximum pressure in the hydraulic circuit is kept at the higher pressure $\overline{P}_{o1}$. As filling of the resin 9 within the cavity 8 progresses and the resin pressure reaches the pressure $P_{ro}$, the set pressure change-over switch 20 is brought into engagement with a contact b, to allow an output of the secondary pressure setting member 14 to be introduced into the electromagnetic proportional relay valve controller 12, to thereby open the electromagnetic proportional relief relay valve 11 and reduce the maximum pressure in the hydraulic circuit to the pressure $\overline{P}_{o2}$.

Figure 5:
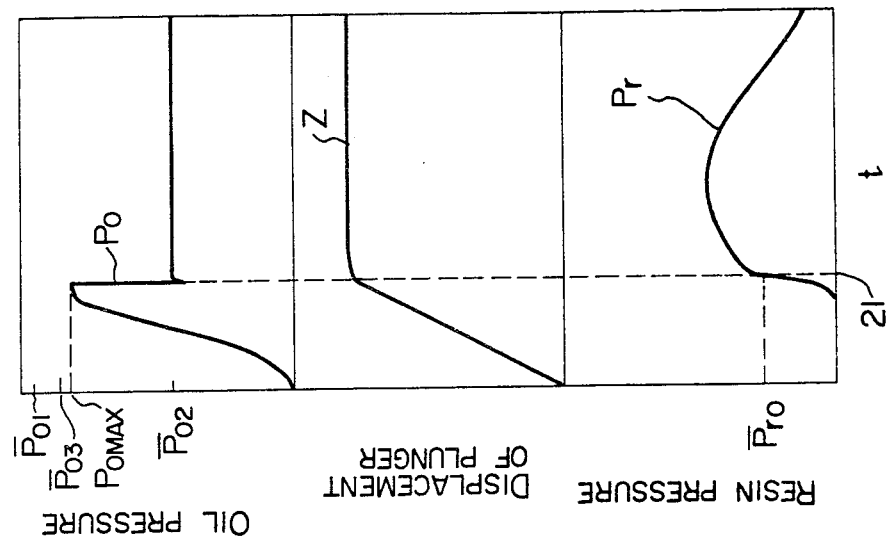
FIG. 5 is a diagram showing the transfer oil pressure, the plunger displacement and the resin pressure in chronological sequence obtained when transfer molding is carried out by means of the embodiment of the present invention shown in FIG. 4.

FIG. 5 shows the chronological changes occurring in the pressure sensed by the hydraulic pressure sensor 17 or transfer oil pressure $P_o$, the displacement Z of the plunger 6 and the resin pressure Pr when transfer molding is carried out by means of the embodiment of the transfer molding machine shown in FIG. 4. While the resin 9 is being transferred into the cavity 8, the maximum hydraulic pressure $\overline{P}_{o1}$ in the hydraulic circuit is kept at a higher level than the transfer oil pressure $P_o$, so that no drop in the velocity of the downward movement of the plunger 6 occurs and filling of the resin into the cavity 8 is completed in a predetermined time. After the resin pressure has reached the set pressure level, the maximum hydraulic pressure $\overline{P}_{o2}$ drops, so that the resin pressure is prevented from reaching an unnecessarily high level. There is a lag of about 0.2 second of the maximum hydraulic pressure in the hydraulic circuit being switched from $\overline{P}_{o1}$ to $\overline{P}_{o2}$ behind the reaching of set pressure level by the resin pressure, due to a delay in actuation of the relay and other parts. By taking this time lag into consideration, the resin pressure is set at a level lower than the holding pressure as aforesaid, to thereby avoid a rise of the internal pressure of the cavity to an inordinately high level. Incidently, in FIG. 5, after the displacement of plunger has stopped, the show up-and-down variation in the resin pressure is observed. This up-and-down variation in the resin pressure occurs because of thermal expansion and setting shrinkage of the resin, respectively. Thus the internal pressure of the cavity 8 is prevented from rising to an inordinately high level, and flash occurrence at the interface of the mold members can be avoided. At the same time, damage to electronic semiconductor elements can also be avoided, and molded products of high quality can be obtained. As shown in FIG. 5, no reduction in the velocity occurs when the plunger 6 is displaced, and the occurrence of a gate being sealed can be avoided. A complete filling of the resin in the cavity 8 can be obtained.

The pressure $\overline{P}_{o3}$ set for the hydraulic pressure setting and comparing member 18 is set at a level slightly higher than a maximum value ($P_{OMAX}$ in FIG. 5) of the transfer oil pressure $P_o$ in a normal transfer-molding operation. By this arrangement, the pressure $\overline{P}_{o3}$ is exceeded by the transfer oil pressure $P_o$ when the viscosity of the resin 9 is increased, or scratching occurs in the sliding portions of the plunger 6 and the mold 30 or other trouble occurs, so that the warning buzzer 19 is actuated to inform the operator of the occurrence of trouble. This is conductive to prevention of continued production of defective articles.

In the embodiment of the invention described hereinabove, it is possible to obtain complete charging of the cavity 8 with the resin 9 in a predetermined period of time even if the runner of the mold 30 has its diameter reduced and the flow resistance offered to the resin 9 is increased. This is conductive to prevention of occurrence of incomplete filling of the resin 9 in the cavity 8 and the increase in the yield of the molded articles. The provision of the warning system helps avoid the occurrence of continued production of defective articles, thereby enabling the quality of the molded articles to be increased.

In the embodiment shown and described hereinabove, switching of the maximum hydraulic pressure in the hydraulic circuit between a plurality of levels has been described as being effected by using the electromagnetic proportional relief valve 11. It is to be understood that the invention is not limited to this switching system and that a servo valve may be used when it is desired to obtain an increasingly precise control of the resin pressure. When less precise control of the resin pressure is tolerated, two ordinary relief valves may be used in cooperation with a direction control valve.

In the embodiment shown and described hereinabove, the mold has only one cavity, because explanation is made easy. It is to be understood that the invention is not limited to this one cavity-mold, and that a mold with many cavities may be used. In this case, the resin pressure sensor might be mounted in a last filling cavity or at a terminal end of a runner.

From the foregoing description, it will be appreciated that the invention enables the yield of the molded products to be increased and the cost of production of molded products to be reduced in transfer-molding of articles. The amount of resin wasted can be reduced, thereby contributing to conservation of energy. A reduction in the amount of wasted resin has the side-effect of reducing expenses for waste disposal.

What is claimed is:

1. A method of transfer molding comprising the steps of:
   (a) charging thermosetting resin into a mold having at least one runner and at least one cavity by applying pressure to the resin by a plunger;
   (b) sensing the resin pressure in said mold by a resin pressure sensor; and
   (c) controlling the pressure applied to the plunger during step (a) by applying a selected primary pressure to said plunger for driving said plunger until the pressure sensed in step (b) reaches a predetermined level and directly switching the pressure applied to the plunger to a secondary holding pressure that is lower than said primary pressure for driving said plunger upon said predetermined level being reached.

2. A method according to claim 1, comprising the further steps of:
   (d) detecting whether or not the pressure for driving said plunger has reached a predetermined level; and
   (e) issuing a warning when the pressure detected in step (d) exceeds said predetermined level.

3. A method according to claim 1 or 2, wherein step (b) is performed with the resin sensor mounted in one of the last filled cavity and a terminal end of said runner in the mold.

4. A method according to claim 1 or 2, wherein step (c) is performed by a plunger driving hydraulic circuit and control therefor comprising a primary pressure setting member for setting said primary pressure, a secondary pressure setting member for setting said secondary pressure, a change-over switch for selectively applying an output of said primary pressure setting member and an output of said secondary pressure setting member to said plunger in accordance with the pressure of the resin charged into said mold which pressure is detected by said resin pressure sensor, and a relief valve for controlling a maximum pressure in said hydraulic circuit by means of electrical switching by an output of said change-over switch.

5. A method according to claim 4, comprising the further steps of:
   (d) detecting whether or not hydraulic pressure within said plunger driving hydraulic circuit has reached a predetermined level; and
   (e) issuing a warning when the pressure detected in step (d) exceeds said predetermined level.

6. A method according to claim 1, wherein prior to step (a) an electronic part to be encapsulated in said resin is inserted in said at least one cavity.

* * * * *